US006996582B2

(12) United States Patent
Daniels et al.

(10) Patent No.: US 6,996,582 B2
(45) Date of Patent: *Feb. 7, 2006

(54) VIRTUAL STORAGE SYSTEMS AND VIRTUAL STORAGE SYSTEM OPERATIONAL METHODS

(75) Inventors: Rodger Daniels, Boise, ID (US); Lee L. Nelson, Boise, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 449 days.

This patent is subject to a terminal disclaimer.

(21) Appl. No.: 10/264,525

(22) Filed: Oct. 3, 2002

(65) Prior Publication Data

US 2004/0068522 A1    Apr. 8, 2004

(51) Int. Cl.
*G06F 17/30* (2006.01)
*G06F 12/00* (2006.01)

(52) U.S. Cl. .......................... 707/200; 711/6
(58) Field of Classification Search ............ 707/1, 707/10, 200–206; 711/203, 206, 6
See application file for complete search history.

(56) References Cited

U.S. PATENT DOCUMENTS

| | | | |
|---|---|---|---|
| 5,392,244 A | | 2/1995 | Jacobson |
| 5,613,113 A | * | 3/1997 | Goldring ................. 707/202 |
| 5,694,599 A | * | 12/1997 | Maegawa et al. .......... 707/206 |
| 6,192,444 B1 | * | 2/2001 | White et al. ................. 711/4 |
| 6,532,527 B2 | * | 3/2003 | Selkirk et al. ............. 711/203 |
| 6,658,548 B1 | * | 12/2003 | Kochar et al. ............. 711/202 |
| 6,742,101 B2 | * | 5/2004 | Miryala et al. ............ 711/202 |

OTHER PUBLICATIONS

HP Executive Summary "Virtualization, Simplification, and Storage"; www.hp.com; Nov., 2001; pps. 1-9.
" Business Copy Virtual Array Integration Guide", " Data Replication and Backup for the HP VA 7000 Series"; Revision Level 1.1; Hew lett-Packard Company; Jul. 2001; pps ii-iv and 1-14.
" Cassini FAQs, Snapshot"; Revision 1; Hewlett-Packard Company; May 2000; pps 1-6.
U.S. Patent Appn. filed Oct. 3, 2002, tilted "Virtual Storage Systems and Virtual Storage System Operational Methods", by Lee L. Nelson and Rodger Daniels, Attorney Docket No. 100110939-1 (HE12-203).

(Continued)

*Primary Examiner*—Frantz Coby
*Assistant Examiner*—Marc R. Filipczyk (57) ABSTRACT

Virtual storage systems and virtual storage system operational methods are described. According to one aspect, a virtual storage system includes a physical storage space configured to store data, a virtual storage space adapted to provide a representation of data stored within the physical storage space to a host, a memory configured to store a plurality of pointers utilized to implement addressing intermediate the physical storage space and the virtual storage space, and a controller configured to extract selected ones of the pointers from the memory and to provide the selected pointers in another storage location different than the memory at a first moment in time and to extract the selected pointers from the another storage location and to provide the selected pointers in the memory at a second moment in time subsequent to the first moment in time.

30 Claims, 4 Drawing Sheets

OTHER PUBLICATIONS

U.S. Patent Appn. filed Oct. 3, 2002, tilted "Virtual Storage Systems, Virtual Storage Methods and Methods for Over Committing a Virtual RAID Storage System", by Michael Brent Jacobson and Lee L. Nelson, Attorney Dockett No. 100110845-1 (HE12-201).

U.S. Patent Appn. filed Oct. 3, 2002, tilted "Computer Systems, Virtual Storage Systems and Virtual Storage System Operation Methods", by Michael Brent Jacobson and Lee L. Nelson, Attorney Docket No. 100110839-1 (HE12-200).

U.S. Patent Appn. filed Oct. 3, 2002, tilted "Method of Managing a Data Storage Array, and a Computer System Including a RAID Controller", by David Umberger and Guillermo Navarro, Attorney Docket No. 100110705-1 (HE12-199).

U.S. Patent Appn. filed Oct. 3, 2002, tilted "Managing a Data Storage Array, A Data Storage System, and a RAID Controller", by David Umberger, Guillermo Navarro, and Rodger Daniels, Attorney Docket no. 100110704-1 (HE12-198).

HP Virtual Array Technology; "Virtual Storage Technology Extends the Capabilities of Fault-Tolerant Storage Subsystems"; w w w .hp.com; Nov. 2001; pps. 1-9.

* cited by examiner

VIRTUAL STORAGE SYSTEMS AND VIRTUAL STORAGE SYSTEM OPERATIONAL METHODS

FIELD OF THE INVENTION

The invention relates to virtual storage systems and virtual storage system operational methods.

BACKGROUND OF THE INVENTION

Computer systems including hardware, software, firmware etc. have continued to experience expansive growth and sophistication in recent years. Peripherals and other components arranged to interface with computer systems have also experienced expansive growth and improvements.

In addition, computer systems are generally used in an increasing number of applications especially with the advancements made in networking solutions enabling communication between remotely spaced computers. For example, computer systems may be utilized in client applications, server applications as well as stand-alone personal computing applications.

With the increased processing speeds of computer systems, and the increasing usage of computer systems in new and varied applications, devices are desired to assist with storing and quickly accessing data processed and used by computer systems. Mass storage devices have been developed to handle large amounts of digital data utilized by computer systems. Redundant storage systems have been developed to provide continued, correct operations during the presence of a fault or other failure in a component or peripheral of a computer system. More specifically, three primary design criteria are typically considered when developing mass storage devices and include cost (low cost per unit of data storage), high input/output performance, and availability (ability to recover data even though some components have failed and to insure continued operation). Redundant array of independent disk (RAID) systems have been utilized to provide redundant storage of relatively large amounts of data.

As described below, aspects of the present invention provide improved systems and methodologies for storing data within a storage system.

DETAILED DESCRIPTION OF THE INVENTION

Attention is directed to the following commonly assigned applications, which were filed the same day as the present application and are incorporated herein by reference:

U.S. patent application Ser. No. 10/264,915 entitled "A System for Managing a Data Storage Array, a Method of Managing a Data Storage System, and a RAID Controller," by inventors David Umberger, Guillermo Navarro and Rodger Daniels; U.S. patent application Ser. No. 10/264,573 entitled "Method of Managing a Data Storage Array, and a Computer System Including a RAID Controller," by inventors David Umberger and Guillermo Navarro; U.S. patent application Ser. No. 10/264,957 entitled "Computer Systems, Virtual Storage Systems and Virtual Storage System Operational Methods," by inventors Michael B. Jacobson and Lee L. Nelson; U.S. patent application Ser. No. 10/264,659 entitled "Virtual Storage Systems, Virtual Storage Methods and Methods of Over Committing a Virtual RAID Storage System," by inventors Michael B. Jacobson and Lee L. Nelson; and U.S. patent application Ser. No. 10/264,661 entitled "Virtual Storage Systems and Virtual Storage System Operational Methods," by inventors Lee L. Nelson and Rodger Daniels.

According to one aspect, a virtual storage system comprises a physical storage space configured to store data, a virtual storage space adapted to provide a representation of data stored within the physical storage space to a host, a memory configured to store a plurality of pointers utilized to implement addressing intermediate the physical storage space and the virtual storage space, and a controller configured to extract selected ones of the pointers from the memory and to provide the selected pointers in another storage location different than the memory at a first moment in time and to extract the selected pointers from the another storage location and to provide the selected pointers in the memory at a second moment in time subsequent to the first moment in time.

According to another aspect, a virtual storage system comprises physical storage means configured to store data at a plurality of physical storage locations, virtual storage means adapted to provide a representation of the physical storage means to a host using a plurality of virtual storage locations, mapping means configured to associate a plurality of the virtual storage locations with a plurality of the physical storage locations, controller means configured to utilize the mapping means to access the physical storage locations, to deactivate a portion of the mapping means at an initial moment in time wherein the deactivated portion of the mapping means is not; utilized to access the physical storage locations, and to activate the portion of the mapping means at a subsequent moment in time wherein the activated portion of mapping means is utilized to access the physical storage locations.

According to yet another aspect, a virtual storage system operational method comprises providing a virtual storage space including a plurality of virtual storage locations, providing a physical storage space including a plurality of physical storage locations configured to store data, and providing a memory comprising a mapping system for associating respective ones of the virtual storage locations with respective ones of the physical storage locations, extracting at least a portion of the mapping system from the memory at a first moment in time, and providing the extracted portion of the mapping system into the memory at a second moment in time subsequent to the first moment in time.

Figure 1:
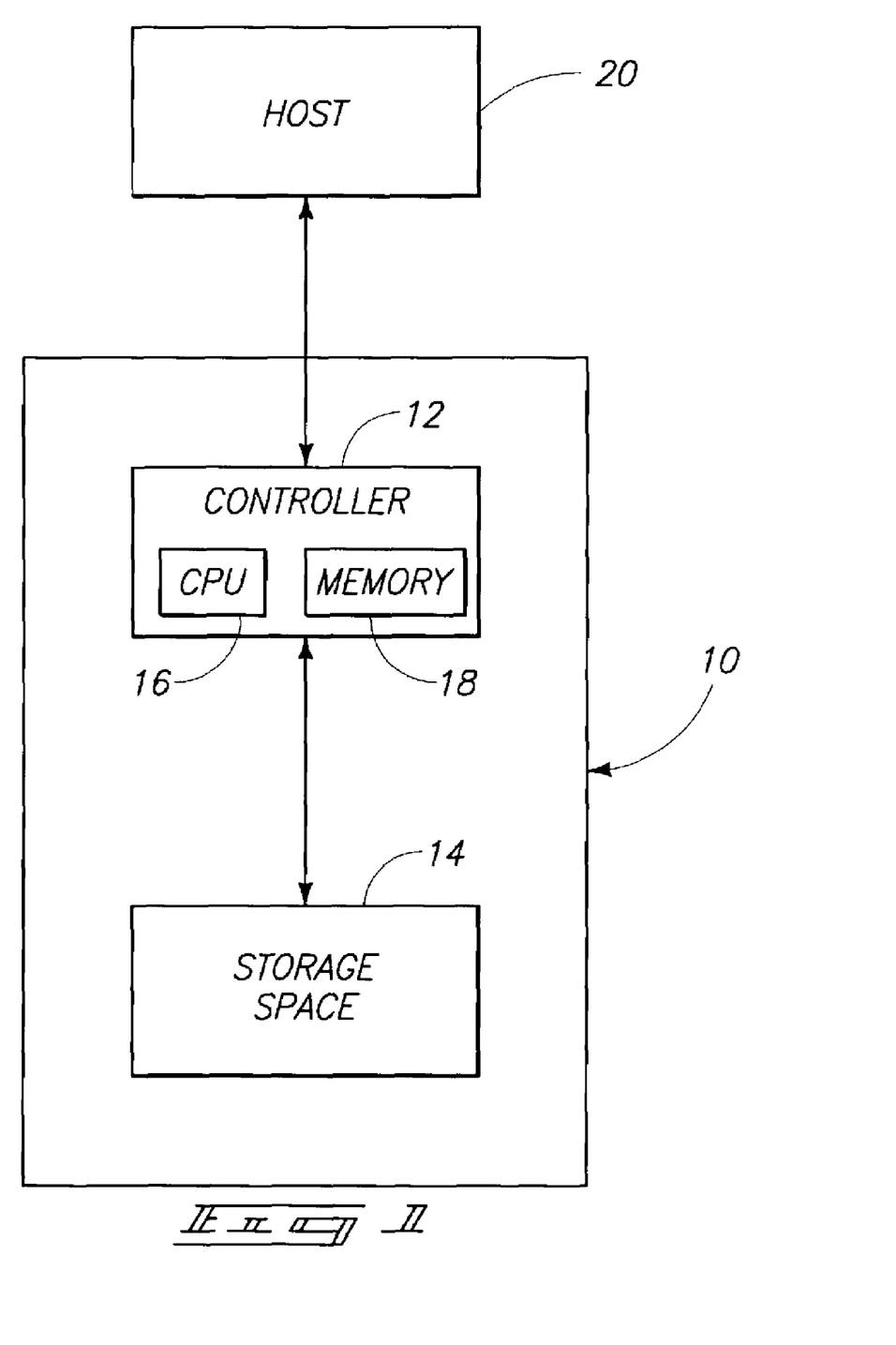
FIG. 1 is a functional block diagram of an exemplary storage system.

Referring to FIG. 1, an exemplary arrangement of a data storage system is depicted as reference number 10. According to aspects of the invention, storage system 10 is embodied as a virtual storage system. In one arrangement, storage system 10 is a virtual array (RAID) storage system having abstract addressing or mapping between a virtual storage space and physical storage space as described in further detail below. Virtual storage system arrangements differ from conventional disk array constructions which utilize mathematical functions to provide literal addressing which are fixed to blocks of physical storage space wherein a given address corresponds to a known physical block. Virtual storage systems implement adaptive, dynamic and arbitrary addressing enabling increased flexibility compared with conventional arrangements. For example, a plurality of virtual storage addresses of virtual storage space may be utilized to address a single physical storage location of physical storage space. In such a virtual storage system arrangement, point in time copies of data, also referred to as snapshot volumes of data, may be created which may result in over commitment of a virtual storage system as divergence of data occurs. Virtual storage system arrangements provide increased apparent capacity and flexibility compared with conventional constructions.

Storage system 10 arranged as a virtual storage configuration utilizes linear addressing space according to a Small Computer System Interface (SCSI) command set in one exemplary configuration. Although the presentation of storage system 10 to a host 20 may be consistent at different moments in time, a mapping system of a virtual storage system arrangement may change to accommodate demands or requirements of the storage system. Exemplary details regarding a virtual storage system are discussed in U.S. Pat. No. 5,392,244 to Jacobson et al., the teachings of which are incorporated herein by reference. Further details and aspects of virtual array technology are described in HP Virtual Array Technology, 2001 and Executive Summary: Virtualization, Simplification and Storage, November 2001, both available from www.hp.com, and the teachings of which are incorporated herein by reference.

Still referring to FIG. 1, storage system 10 in the exemplary described arrangement includes a controller 12 and storage space 14 arranged to store data. Storage system 10 in the illustrated application is configured to interface with host 20. Storage system 10 is arranged to store data received from host 20 as well as provide requested data to host 20. Host 20 may be implemented as a workstation, personal computer, server, network of computer devices, or other appropriate computer structure utilizing a separate data storage system.

In the illustrated configuration, controller 12 is arranged to implement interfacing operations with respect to host 20 including handling of input/output (I/O) requests. In addition, controller 12 provides management of storage space 14 including addressing of storage space 14 and implementing storage of data therein. As described below in one exemplary configuration, controller 12 is arranged to create a virtual storage space representation of physical storage space and a mapping system to provide addressing there between.

In the depicted exemplary arrangement, controller 12 includes a central processing unit (CPU) 16 and memory 18. An exemplary central processing unit is a PowerPC 440 or 8240 available from Motorola, Inc.

Controller 12 of storage system 10 may be configured to implement AutoRAID operations as discussed in the '244 patent discussed above. Controller 12 implementing. AutoRAID operations may monitor use of data stored within system 10 and determine a best RAID level for the data. For example, infrequently written data is stored in RAID 5DP providing storage efficiency while frequently written data may be stored in RAID 1+0 providing optimum performance. Data may be moved between RAID levels depending upon the age of the data, frequency of accessing the data, corruption of a physical disk, and other factors.

Memory 18 may be utilized to store maps as described further below for use in addressing storage space 14, to store executable code usable by controller 12, and to provide a cache for temporarily storing data. Memory 18 may be implemented as random access memory (RAM) and include a plurality of separate memory areas for storing executable code, maps, and cache in one embodiment.

Figure 2:
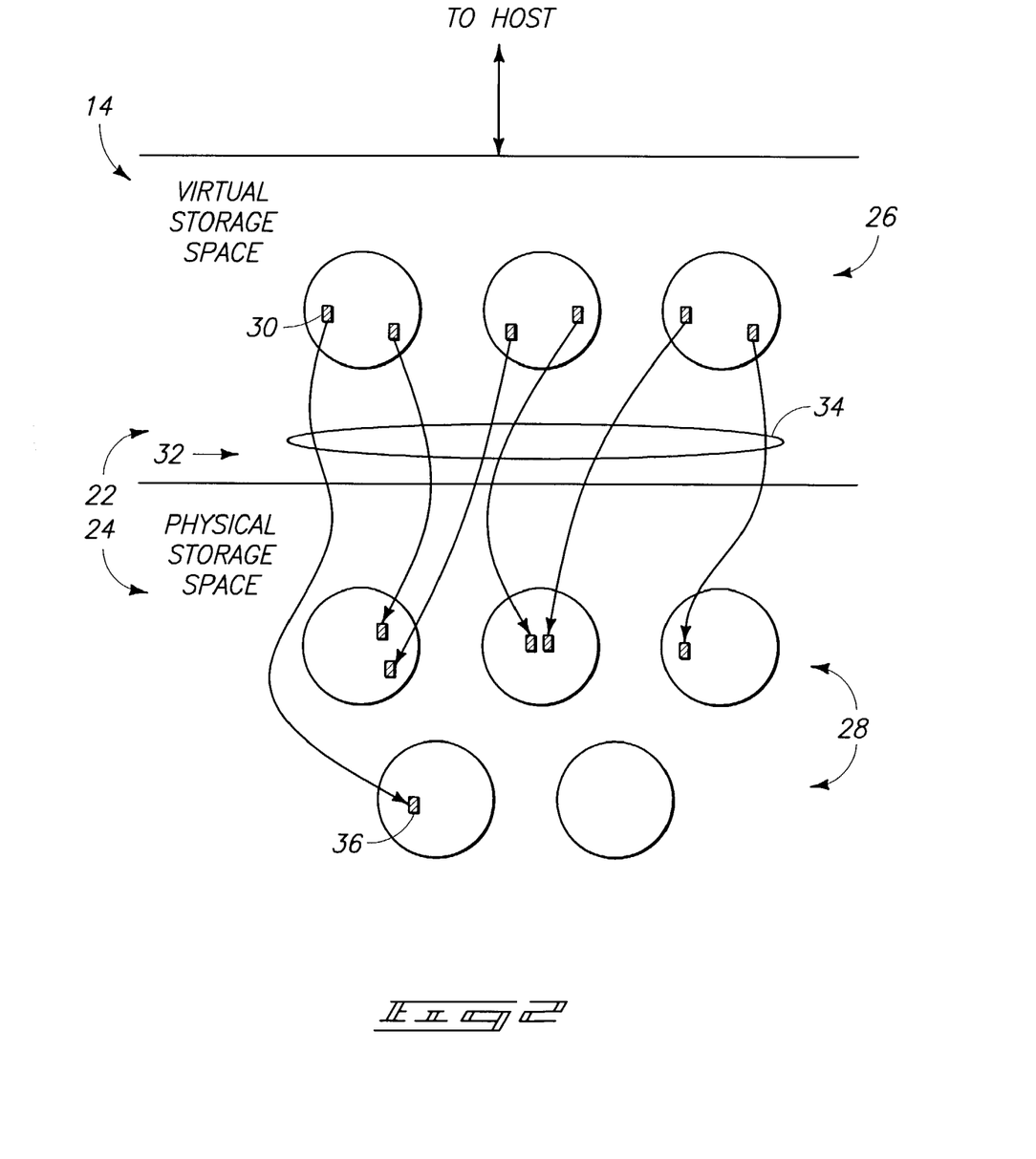
FIG. 2 is an illustrative representation of the storage system of FIG. 1 implemented as an exemplary virtual storage system.

Referring to FIG. 2, an illustrative representation of storage space 14 of system 10 is shown. Storage space 14 includes a virtual storage space 22 and a physical storage space 24 according to an exemplary virtual storage architecture of the described system 10. Virtual storage space 22 includes a plurality of virtual storage volumes 26 and physical storage space 24 includes a plurality of physical storage volumes 28. The depicted number of volumes 26, 28 is exemplary and more or less volumes 26 or volumes 28 may be utilized in a given application.

Virtual storage volumes 26 may be referred to as logical unit numbers (LUNs), logical volumes or logical drives. Virtual storage space 22 including virtual storage volumes 26 provide a convenient representation of storage capacity to host 20. Host 20 may utilize a SCSI command set to implement addressing of storage space 14 including virtual storage volumes 26. Host 20 may implement a logical volume manager, such as LVM software for use in an HP-UX operating system and available from Hewlett-Packard Company, to provide centralized management of storage system 10. For example, a logical volume manager may provide a virtualization of data storage of storage system 10 within host 20 for use in interfacing storage system 10 with host applications. Management features of system 10 may appear in a plurality of software management interfaces: SCSI command set, Virtual Front Panel (VFP), Graphical User Interface (GUI), Command Line User Interface (CLUI), Application Programming Interface (API), etc. for use in various solutions integrations.

Physical storage volumes 28 may comprise an array of disks individually configured to provide actual storage digital data (i.e., no data is stored using virtual storage space in the described configuration). In one aspect, controller 12 controls storage of data using volumes 28 according to desired RAID levels. The number of volumes 28 may be tailored to the particular implementation of system 10.

Virtual storage space 22 provides an abstract representation of physical storage space 24 to host 20. Virtual storage space 22 may be modified as desired by controller 12 or host 20. For example, virtual storage space 22 may be tailored to represent physical storage space 24 in a format which may be conveniently accessed by host 20. In turn, a logical volume manager of host 20 may provide yet another virtual abstraction of virtual storage space 22 (not shown) in a format which may be conveniently utilized by host applications.

Virtual storage space 22 of system 10 includes a plurality of addresses or storage locations 30. The depicted exemplary physical storage space 24 includes a plurality of addresses or storage locations 36. Addresses 30 of virtual storage space 22 are utilized to provide addressing of addresses 36 of physical storage space 24 wherein data is stored.

For example, in one embodiment, controller 12 operates to create and implement a mapping system 32 comprising a plurality of pointers 34 to access physical storage locations 36. Pointers 34 of mapping system 32 may be stored within memory 18 to implement addressing to associate a plurality of respective addresses or locations 30 of virtual storage space 22 with respective addresses or locations 36 of physical storage space 24.

Host 20 may read or write data with respect to system 10 by submitting requests. Such requests may address a storage location 30 of virtual storage volumes 26. A request received from host 20 identifying a virtual storage location 30 has an associated pointer 34 which identifies the respective physical storage location 36 which contains the actual data to be read by host 20, or written to by host 20, as indicated in the request identifying the virtual storage location 30.

Individual virtual storage locations 30 may represent a common predefined amount of data at physical storage locations 36 in the described implementation. For example, virtual storage locations 30 may refer to clusters including 512 blocks which individually include 512 bytes of data in one exemplary arrangement. Accordingly, a virtual storage location 30 refers to a cluster size piece of data of a respective physical storage location 36 including 512 blocks individually comprising 512 bytes of data providing a total of 256 Kbytes of data per physical storage address or location 36 in one embodiment.

Storage system 10 arranged according to a virtual storage architecture is able to implement operations not capable in conventional RAID systems. For example, controller 12 may create a virtual copy of a storage volume 26 by duplicating the pointers of the original volume 26 being copied rather than duplicating the data itself. Such duplication of pointers may be referred to as providing a point in time copy or a snapshot volume of a virtual storage volume 26.

Figure 3:
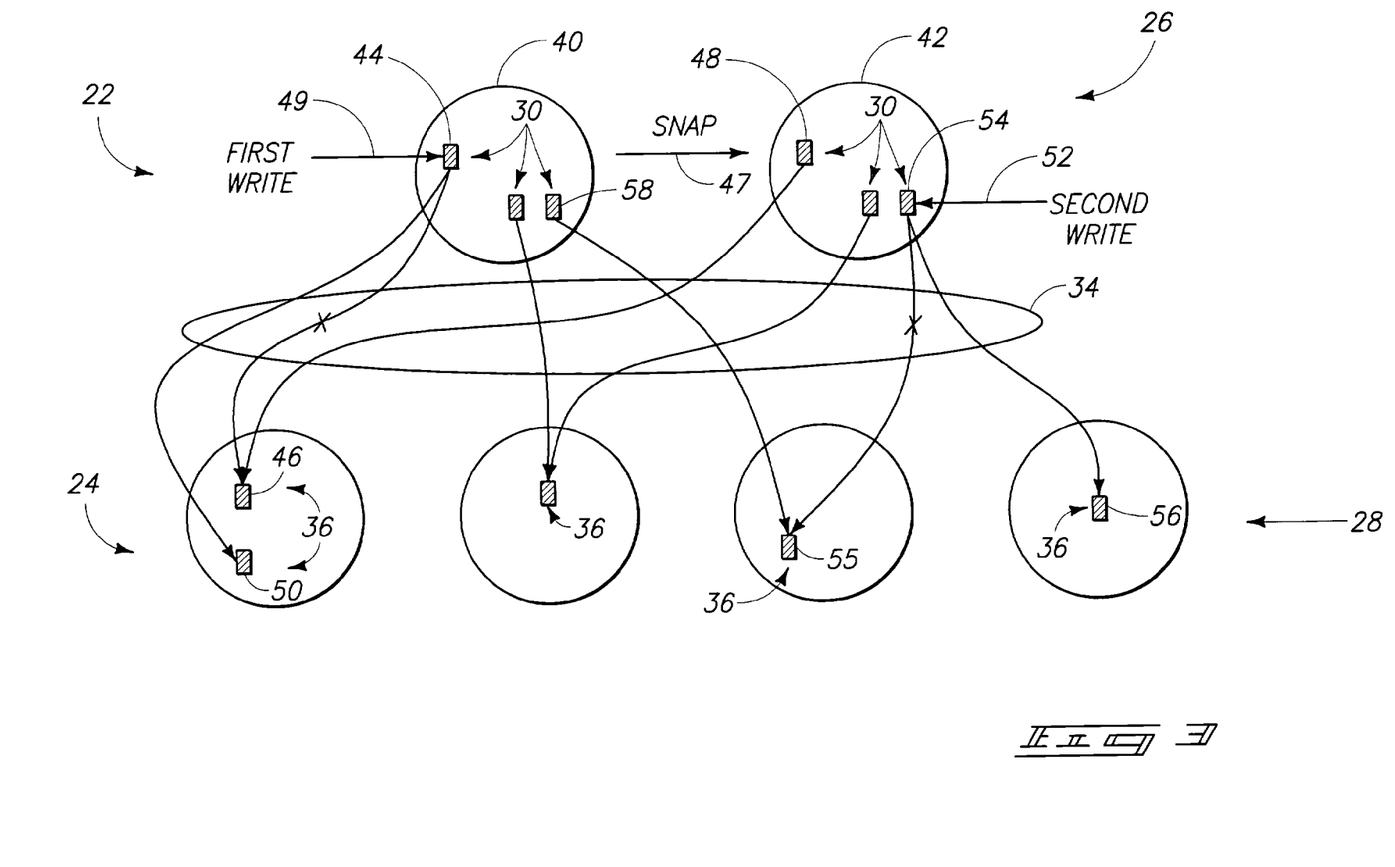
FIG. 3 is an illustrative representation of a snapshot operation of the exemplary virtual storage system.

Referring to FIG. 3, additional details of exemplary point in time copy or snapshot operations are described. A plurality of virtual storage volumes 26 and physical storage volumes 28 are shown in FIG. 3. A first virtual storage volume 40 may be referred to as a parent or original volume while a second virtual storage volume 42 may be referred to as a snapshot volume 42. Snapshot operations may be performed to create a new snapshot volume or to refresh an existing snapshot volume to provide a snapshot of the original volume.

In the depicted example, original volume 40 includes a plurality of respective pointers 34 at a given moment in time which map virtual storage locations 30 to physical storage locations 36. During a snapshot operation, controller 12 creates another virtual storage volume 42 of the original volume 40. In one embodiment, controller 12 copies the associated pointers 34 of volume 40 and creates volume 42 including the same pointers 34 pointing to the same physical storage locations 36 as original volume 40 at the moment in time when volume 40 is snapped.

When first created, snapshot volume 42 shares all of its associated physical storage space 28 with original volume 40. Thereafter, data of either the snapshot volume 42 or the original volume 40 may be updated responsive to operations from host 20 or internal operations of controller 12. When an update occurs, new physical storage space is allocated to hold the new/modified data. The corresponding pointer(s) 34 for the new/modified data of either the snapshot volume 42 or the original volume 40 (i.e., the volume that received the new/modified data) are set to point to the new physical storage address 36 storing the new data while the corresponding respective pointer(s) 34 of the unmodified data point to the same or original address(es) 36 to preserve the snapped data. The provision of new pointers for the new\modified data process is called divergence. Space that has diverged is no longer shared between snapshot volume 42 and original volume 40.

For example, as shown in FIG. 3, a virtual storage location 44 initially addresses a physical storage location 46. Accordingly, following a snapshot operation 47 of original volume 40, a respective virtual storage location 48 of snapshot volume 42 also addresses physical storage location 46. Thereafter, assume a first write operation 49 occurs to virtual storage location 44. Data is retrieved from physical storage location 46, modified by the first write operation, and stored as diverged data in a new physical storage location 50. The pointer 34 associated with virtual storage location 44 becomes a divergence pointer to address physical storage location 50 following the first write operation 48. However, a pointer 34 of virtual storage location 48 of snapshot volume 42 still addresses physical storage location 46 providing access to the unmodified original data which was snapped.

Updates to data of snapshot volume 42 may also occur as illustrated by the exemplary second write operation 52 to a virtual storage location 54 of snapshot volume 42. A pointer 34 previously associated with virtual storage location 54 and a corresponding physical storage location 55 is adjusted to now refer to a new physical storage location 56 following the second write operation and including the modified data which was previously stored as physical storage location 55. A pointer 34 associated with a virtual storage location 58 of original volume 40 still addresses physical storage location 55 following the second write operation.

Since a snapshot volume does not consume additional physical storage space at the moment in time the parent volume is snapped, it is possible to configure a snapshot volume so that available physical storage space of storage system 10 becomes exhausted as divergence occurs. System 10 permits snapshot operations even if system 10 does not have sufficient physical storage space to accommodate divergence of the resulting snapshot volume as data is modified. This state of the storage system 10 may be referred to as over committed. It may be advantageous to allow storage system 10 to become over committed because one or more snapshot volumes of system 10 may not experience complete divergence in their cycle of use. In such a case and with over commitment, storage system 10 may give an appearance that it has more storage space (represented by virtual storage space) than its available physical storage space.

As mentioned previously, mapping system 32 comprising a plurality of pointers 34 may be stored within memory 18. It may be desired to free portions of memory 18 (portions of memory 18 dedicated to storage of pointers 34 may also referred to as mapping space) to accommodate additional pointers 34, to provide additional cache space, to provide other storage space, or for other reasons. Aspects of the invention provide structural embodiments and methodologies for using memory 18 or other mapping space to enhance storage capabilities of mapping system 32 for additional pointers or for other reasons.

According to one operational aspect, controller 12 is arranged to extract portions of mapping system 32, and pointers 34 thereof, to provide storage capacity for new pointers 34 or other purposes. Thereafter, the extracted portions of mapping system 32 and pointers 34 may be again provided into memory 18 for use in implementing addressing intermediate virtual storage space 22 and physical storage space 24.

One embodiment provides identification of portions of mapping system 32, including the appropriate pointers 34 thereof, which may be extracted from memory 18 with minimal adverse effects upon the performance of system 10 resulting from the extraction of the portions of mapping system 32. For example, in one aspect, it is desired to extract portions of mapping system 32 which will result in minimal delays during operation of system 10 and handling of I/O requests from host 20.

Snapshot volumes described above are commonly utilized in exemplary operations for restore operations or to stream data to tape storage media. Otherwise, the data of snapshot volumes may not be accessed, modified or utilized for relatively extended periods of time. However, the generation of snapshot volumes consumes resources of memory 18 for storage of pointers 34 for the snapshot volume. Accordingly, even though a snapshot volume may not consume additional physical storage space, memory 18 is utilized in one embodiment to store the pointers 34 for the snapshot volume.

According to aspects of the invention, controller 12 may utilize criteria, including for example the type of the virtual storage volumes 26, to identify portions of mapping system 32 as candidates for deactivation. Controller 12 may utilize criteria for identifying portions of the mapping space 32 to be deactivated including for example identifying volumes which are snapshot volumes or are not regular volumes. Controller 12 is arranged to extract portions of mapping system 32 including pointers 34 from memory 18 for a snapshot or other volume according to on exemplary arrangement. Extraction of respective portions of the mapping system 32 for a virtual storage volume may be referred to as deactivating the virtual storage volume. According to exemplary described aspects, controller 12 identifies one or more virtual storage volume as candidate(s) for deactivation, and thereafter extracts the respective portions of the mapping system 32 and the pointers 34 from memory 18 corresponding to the identified volume(s) 26.

According to other aspects of the invention, controller 12 may utilize additional or other criteria for identifying appropriate virtual storage volumes 26 or portions of mapping system 32 to be deactivated. For example, controller 12 may monitor a period of dormancy for a given virtual storage volume 26 wherein there is a lack of input/output requests from a host 20 with respect to the volume 26 for a predetermined period of time. The controller 12 may use such or other criteria to specify deactivation of the virtual storage volume 26.

In one embodiment, controller 12 extracts the pointers 34 of the mapping system 32 which correspond to an identified snapshot volume or other virtual storage volume 26 from memory 18 to increase the amount of memory 18 available for other uses including storage of additional pointers 34. Controller 12 may copy or remove the pointers 34 or portions of mapping system 32 to perform the described extraction. The extracted portions of the mapping system 32 may be referred to as deactivated portions of mapping system 32. The deactivated portions of the mapping system 32 and deactivated virtual storage volume(s) 26 are not utilized to access physical storage locations while in a deactivated state according to aspects of the invention. Activated portions of mapping system 32 are utilized to implement addressing intermediate virtual storage space 22 and physical storage space 24.

In one exemplary extraction operation, controller 12 accesses a table which identifies storage objects corresponding to an identified snapshot or other volume for deactivation. Individual storage objects identify a plurality of pages of pointers 34 for the identified volume. Individual pages, also referred to as segments, have a size of 64 KB and include 16,384 pointers 34. Individual pointers 34 point to clusters having a size of 256 KB of physical storage space at a respective physical storage location 36 as mentioned previously. Accordingly, individual pages or segments address 4 GB of data within physical storage space 24 in the described exemplary embodiment. The pointers 34 are paged out or otherwise extracted from memory 18 following identification of the appropriate volume and the respective storage objects, pages and pointers 34. Accordingly, in one embodiment, pointers 34 may be extracted according to one or more page of an identified volume to be deactivated.

According to the exemplary described implementation, the extracted pointers 34 are copied to or otherwise provided within other storage locations different than an initial storage location (e.g., memory 18). For example, the extracted pointers 34 are copied to physical storage volumes 28 of physical storage space 24. Following extraction, the portions of memory 18 which stored the extracted pointers 34 are thereafter available for storage of different pointers 34 (e.g., for a new or existing different virtual storage volume 26). Accordingly, following extraction of the identified pointers 34 from memory 18, the available capacity of the mapping space of memory 18 to accommodate storage of new pointers 34 is increased. Controller 12 is arranged in such an embodiment to write new pointers 34 into memory 18 at locations of the extracted pointers 34 if desired.

At subsequent moments in time after deactivation, deactivated pointers 34 or deactivated portions of mapping system 32 (e.g., corresponding to a deactivated virtual storage volume 26) may be reactivated by controller 12 to again provide addressing of physical storage locations 36 using the reactivated pointers 32. For example, controller 12 may extract the pointers 34 for a deactivated virtual storage volume 26 from physical storage space 24 and provide such pointers 34 in memory 18 to reactivate the virtual storage volume 26 and the respective pointers 34.

Controller 12 may initiate a reactivation procedure responsive to a plurality of criteria in different arrangements. Exemplary criteria include a request for a restore operation of data of the deactivated virtual storage volume 26, for writing the data of the volume 26 to tape, or for other reasons. As described in the patent application Ser. No. 10/264,661 having incorporated herein by reference, updates which occurred during the deactivation may be stored within a journal and applied to the reactivated virtual storage volume 26. Another virtual storage volume 26 may be deactivated to accommodate the reactivation of a given virtual storage volume 26 and to provide adequate mapping space within memory 18.

Figure 4:
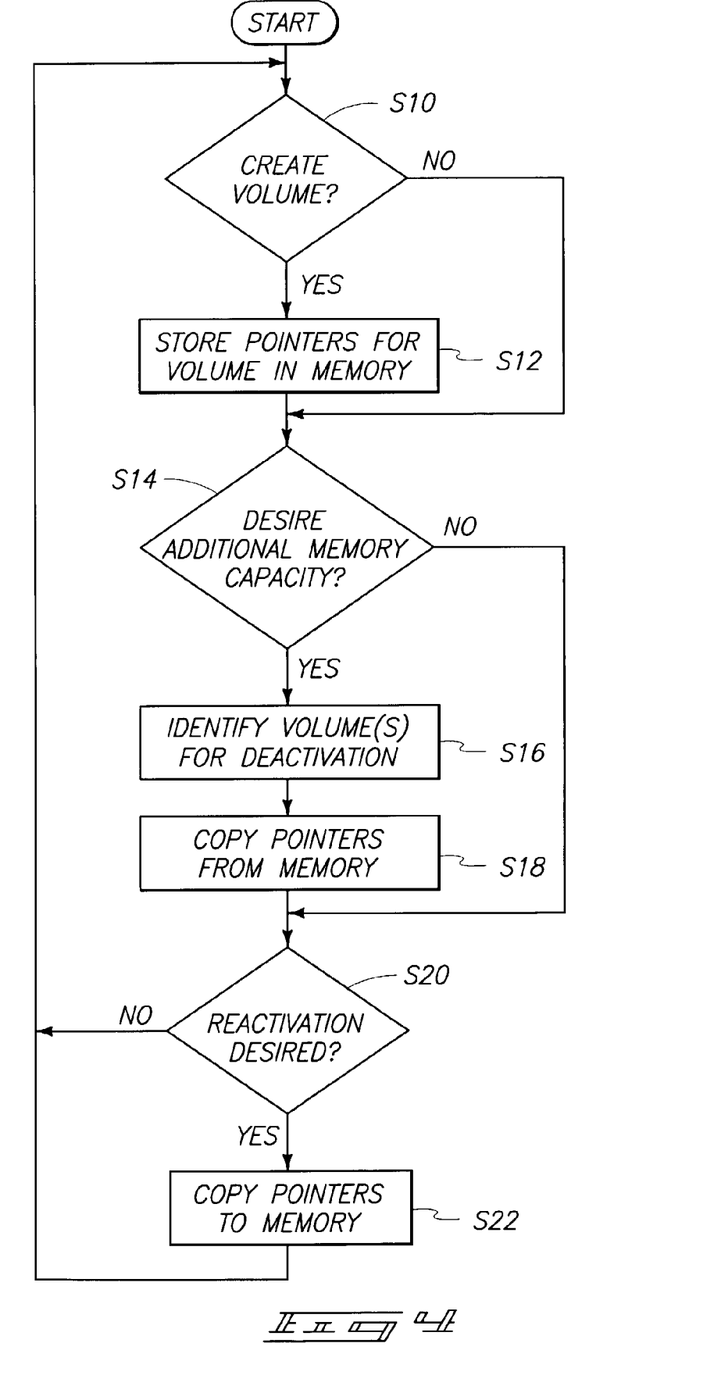
FIG. 4 is a flow chart depicting an exemplary methodology of management of a mapping system of the virtual storage system.

FIG. 4 shows an exemplary operational method executable by controller 12 to implement exemplary aspects of the invention. The depicted methodology may be embodied as executable code within memory 18 and executed by controller 12. Other methods are possible including more, less or alternative steps.

Initially, at a step S10, it is determined whether the creation of an additional virtual storage volume such as a snapshot volume is desired. If not, the depicted method proceeds to a step S14.

If the condition of step S10 is affirmative, the controller may proceed to a step S12 to store pointers for the created volume within memory.

At step S14, it is determined whether additional memory capacity is desired. If the condition of step S14 is negative, the depicted method may proceed to a step S20.

If the condition of step S14 is affirmative, the controller may proceed to a step S16 to identify one or more virtual storage volume for deactivation.

At a step S18, the controller extracts pointers for the identified one or more virtual storage volume from an initial storage location (e.g., memory) and provides the pointers in an appropriate destination storage location, such as physical storage space.

At step S20, it is determined whether reactivation of one or more virtual storage volume is desired. If the condition of step S20 is negative, controller may return to step S10.

If the condition of step S20 is affirmative, the controller may proceed to a step S22 to extract deactivated pointers of a deactivated virtual storage volume from the respective storage location, such as physical storage space, and provide the pointers in memory.

As described herein, aspects of the invention provide systems and methodologies for reducing an impact of a limited resource, such as memory 18, upon the operations of a virtual storage system 10 including operations of performing snapshot operations. Aspects of the invention enable accommodation of additional virtual storage volumes 26 than would otherwise be provided in systems wherein all the pointers for the volumes are resident within memory 18. Aspects of the invention also provide improvements over some systems wherein maps are paged into and out of memory according to a least recently used algorithm.

According to some arrangements of the invention, deactivation of virtual storage volumes, such as snapshot volumes, alleviates limitations imposed by fixed resources, such as memory 18. Specific virtual storage volumes may be identified and selected for deactivation as described above to maintain performance and speed of system 10. For example, deactivation of snapshot volumes is not believed to greatly degrade the performance and the speed of system 10 inasmuch as such volumes are not typically actively used until it is desired to restore old data or stream data to tape wherein speed may not be of significant importance. Following restoration or streaming of data to tape, it may be desired to again deactivate the virtual storage volume. Accordingly, provision of pointers 34 with strict performance requirements may be maintained in memory 18 in an active state to assure optimal performance of system 10 while other pointers 34 may be identified and deactivated.

Aspects of the invention enable system 10 to be over committed while minimizing utilization of resources of memory 18 for virtual storage volumes which have no or minimal requirements for speed or performance. Structures and methods of the invention enable support of additional virtual storage volumes, such as snapshot volumes, compared with conventional storage arrangements.

The protection sought is not to be limited to the disclosed embodiments, which are given by way of example only, but instead is to be limited only by the scope of the appended claims.

What is claimed is:

1. A virtual storage system comprising:
   a physical storage space configured to store data;
   a virtual storage space adapted to provide a representation of the data stored within the physical storage space to a host;
   a memory configured to store a plurality of pointers utilized to implement addressing intermediate the physical storage space and the virtual storage space; and
   a controller configured to extract selected ones of the pointers from the memory and to provide the selected pointers in a storage location different than the memory at a first moment in time and to extract the selected pointers from the storage location and to provide the selected pointers in the memory at a second moment in time subsequent to the first moment in time.

2. The system of claim 1 wherein the physical storage space comprises a plurality of physical storage volumes, and the controller is configured to provide the selected ones of the pointers in the storage location of at least one of the physical storage volumes.

3. The system of claim 1 wherein the controller is configured to write new pointers into the memory at locations of the extracted pointers after the extracting.

4. The system of claim 1 wherein the physical storage space comprises a plurality of hard disks, and the virtual storage space comprises a plurality of virtual storage volumes.

5. The system of claim 1 wherein the memory comprises random access memory.

6. The system of claim 1 wherein the controller is configured to identify the selected ones of the pointers before the extracting and using a criteria.

7. The system of claim 6 wherein the controller is configured to identify responsive to the criteria comprising not receiving an input/output request with respect to the selected ones of the pointers for a predetermined period of time.

8. The system of claim 6 wherein the controller is configured to identify responsive to the criteria comprising the selected ones of the pointers being associated with a snapshot volume of the virtual storage space.

9. The system of claim 6 wherein the controller is configured to identify responsive to the criteria comprising the selected ones of the pointers not being associated with a regular volume of the virtual storage space.

10. A virtual storage system comprising:
    physical storage means configured to store data at a plurality of physical storage locations;
    virtual storage means adapted to provide a representation of the physical storage means to a host using a plurality of virtual storage locations;
    mapping means configured to associate a plurality of the virtual storage locations with a plurality of the physical storage locations; and
    controller means configured to utilize the mapping means to access the physical storage locations, to deactivate a portion of the mapping means at an initial moment in time wherein the deactivated portion of the mapping means is not utilized to access the physical storage locations, and to activate the portion of the mapping means at a subsequent moment in time wherein the activated portion of mapping means is utilized to access the physical storage locations.

11. The system of claim 10 further comprising a memory means, and the mapping means is stored within the memory means comprising random access memory.

12. The system of claim 11 wherein the mapping means comprises pointer means, and the controller means is configured to extract the pointer means corresponding to the portion of the mapping means at the initial moment in time and to provide the extracted pointer means in other storage means to deactivate the portion of the mapping means.

13. The system of claim 12 wherein the physical storage means comprises a plurality of disk means, and the controller means is configured to provide the pointer means in the other storage means comprising the disk means.

14. The system of claim 12 wherein the controller means is configured to write new pointer means over the extracted pointer means after the initial moment in time.

15. The system of claim 10 wherein the controller means is configured to identify the portion of the mapping means before the deactivating using a criteria.

16. The system of claim 15 wherein the controller means is configured to identify responsive to the criteria comprising not receiving an input/output request with respect to the portion of the mapping means for a predetermined period of time.

17. The system of claim 15 wherein the controller means is configured to identify responsive to the criteria comprising the portion of the mapping means being associated with a snapshot volume of the virtual storage means.

18. The system of claim 15 wherein the controller means is configured to identify responsive to the criteria comprising the portion of the mapping means not being associated with a regular volume of the virtual storage means.

19. A virtual storage system operational method comprising:
   providing a virtual storage space including a plurality of virtual storage locations;
   providing a physical storage space including a plurality of physical storage locations configured to store data; and
   providing a memory comprising a mapping system for associating respective ones of the virtual storage locations with respective ones of the physical storage locations;
   extracting at least a portion of the mapping system from the memory at a first moment in time; and
   providing the extracted portion of the mapping system into the memory at a second moment in time subsequent to the first moment in time.

20. The method of claim 19 wherein the providing the physical storage space comprises providing a plurality of physical storage volumes, and the providing the extracted portion comprises providing the extracted portion of the mapping system in at least one of the physical storage volumes.

21. The method of claim 19 wherein the providing the memory comprises providing the memory comprising the mapping system including a plurality of pointers, and the extracting comprises extracting some of the pointers.

22. The method of claim 21 further comprising writing new pointers into the memory at locations of the extracted pointers after the extracting.

23. The method of claim 19 wherein the providing the virtual storage space comprises providing a plurality of virtual storage volumes, and the providing the physical storage space comprises providing a plurality of hard disks.

24. The method of claim 23 wherein the virtual storage volumes comprise LUNs.

25. The method of claim 19 wherein the providing the memory comprises providing random access memory.

26. The method of claim 19 wherein the providing the virtual storage space comprises providing a plurality of virtual storage volumes, and further comprising identifying one of the virtual storage volumes, and wherein the extracting comprises extracting at least the portion of the mapping system corresponding to the identified one of the virtual storage volumes.

27. The method of claim 26 wherein the identifying comprises identifying responsive to a criteria.

28. The method of claim 27 wherein the identifying comprises identifying responsive to the criteria comprising the identified virtual storage volume not receiving an input/output request for a predetermined period of time.

29. The method of claim 27 wherein the identifying comprises identifying responsive to the criteria that the identified virtual storage volume comprises a snapshot volume.

30. The method of claim 27 wherein the identifying comprises identifying responsive to the criteria that the identified virtual storage volume not comprise a regular volume.

* * * * *